(12) United States Patent
Sey

(10) Patent No.: US 6,223,388 B1
(45) Date of Patent: May 1, 2001

(54) CASTOR ASSEMBLY

(75) Inventor: James Dey Andrew Sey, Hampshire (GB)

(73) Assignee: Revvo Castor Company Limited, Dorset (GB)

( * ) Notice: Subject to any disclaimer, the term of this patent is extended or adjusted under 35 U.S.C. 154(b) by 0 days.

(21) Appl. No.: 09/284,323

(22) PCT Filed: Sep. 16, 1997

(86) PCT No.: PCT/GB97/02520

§ 371 Date: Jun. 28, 1999

§ 102(e) Date: Jun. 28, 1999

(87) PCT Pub. No.: WO98/15480

PCT Pub. Date: Apr. 16, 1998

Related U.S. Application Data

(60) Provisional application No. 60/028,589, filed on Oct. 16, 1996.

(30) Foreign Application Priority Data

Oct. 8, 1995 (GB) .................................................. 9620980
Jul. 18, 1997 (GB) .................................................. 9715207

(51) Int. Cl.⁷ ............................................................. B60B 33/00
(52) U.S. Cl. ..................................................... 16/46; 16/20
(58) Field of Search ................................... 16/46, 45, 20, 16/48, 30, 40, 43, 42 R, 18 CG

(56) References Cited

U.S. PATENT DOCUMENTS

| 3,246,908 | * | 4/1966 | Marvin | 16/48 |
| 3,724,022 | * | 4/1973 | Alberti et al. | 16/45 |
| 3,806,986 | | 4/1974 | Wentworth . | |
| 4,054,964 | * | 10/1977 | Kaneko | 16/20 |
| 4,125,183 | | 11/1978 | Lang . | |
| 4,316,305 | * | 2/1982 | Seaford | 16/21 |
| 4,384,387 | * | 5/1983 | Pachuta | 16/107 |
| 4,871,052 | * | 10/1989 | Huber | 16/26 |
| 5,076,412 | | 12/1991 | Huber . | |
| 5,097,565 | | 3/1992 | Shorey . | |
| 5,379,485 | * | 1/1995 | Oshins et al. | 16/24 |
| 5,655,259 | | 8/1997 | Look . | |

FOREIGN PATENT DOCUMENTS

| 0 435 022 | 7/1991 | (EP) . |
| 22 260 | of 1915 | (GB) . |
| 2 285 575A | 7/1995 | (GB) . |

OTHER PUBLICATIONS

"Low Silhouette Caster", W.L. Aderman, IBM Technical Disclosure Bulletin, vol. 11, No. 7, Dec., 1968.

* cited by examiner

Primary Examiner—Chuck Y. Mah
(74) Attorney, Agent, or Firm—Flynn, Thiel, Boutell & Tanis, P.C.

(57) ABSTRACT

A castor assembly suitable for use in decks or dollies for moving freight or other heavy items includes a wheel, a carriage on which the wheel bracket is mounted for rotation about a first axis and a bearing enabling the carriage to rotate about a second axis at an angle different than the first axis, the first axis being offset from the second axis. The bearing includes an inner bearing ring and an outer bearing ring movable relative to one another. The inner bearing ring is secured for rotation with the carriage about the second axis. The inner bearing ring is disposed generally concentrically within the outer bearing ring and the carriage is disposed generally concentrically within the inner bearing ring. The inner and outer bearing rings and the carriage together form a substantially planar assembly.

21 Claims, 9 Drawing Sheets

CASTOR ASSEMBLY

This appln. is a 371 of PCT/GB97/02520 filed Sep. 16, 1997 and also claims the benefit of provisional Ser. No. 60/028,589 filed Oct. 16, 1996.

FIELD OF THE INVENTION

Luggage and items of cargo, for example, goods contained in packing cases, have to be manhandled and moved from place to place around airports and other similar locations. They are often moved across conveying surfaces which are either horizontal or inclined. It is known to include in such surfaces friction reducing devices as castors, rollers or ball units, so as to facilitate sliding of the load to be moved over the conveying surface. Conveying surfaces of this type may be fixed, in which case they are usually referred to as 'decks', or may be mounted on a wheeled framework so that they can be moved to wherever they are needed, in which case they are called 'dollies'.

Decks and dollies of this kind are also used in a wide range, of other materials handling applications.

The present invention relates to castor assemblies for use in such decks and dollies.

BACKGROUND OF THE INVENTION

Such castor assemblies are to be regarded as 'consumables' in this field. In the United States alone, around two million castor assemblies are used each year. It is, consequently, important that the castor assemblies themselves are of rugged construction so as to minimise wear, that they are mounted on decks or dollies so as to minimise the likelihood of damage and, finally, that they are mounted in such a way that they can be quickly and easily replaced when worn.

In the case of dollies it is also desirable that the dollies themselves should be of lightweight construction so that they can be moved easily from place to place. Most known dollies consist of a sub-frame, provided with wheels, on which the castor assemblies are mounted. A strong and relatively heavy sub-frame is needed to support the castor assemblies but the openings defined by the sub-frame between the castor assemblies are dangerous to personnel, who can easily damage legs and ankles if walked upon and they slip into these openings. In addition, the relatively open sub-frame allows the castors to be damaged in use. It has therefore been usual to close over the sub-frame by means of cover plates which serve to protect the castor assemblies against damage and when a castor "toeplate" is fitted also protect personnel against injury.

The need for both a substantial sub-frame and cover plates to protect the castor assemblies have added to the weight of the dolly.

Decks are used not only in airport buildings and the like but also inside the cargo holds of aircraft themselves, where space and weight is at a premium. In such locations, it is essential that decks be made as shallow as possible so that they do not reduce the usable height of the cargo hold and, hence, the available storage space, any more than is necessary.

SUMMARY OF THE INVENTION

In accordance with a first aspect of the invention there is provided a castor assembly comprising a wheel, a wheel-plate on which the wheel is mounted for rotation about a first axis and a bearing enabling the wheel-plate to rotate about a second axis at an angle to the first axis, the first axis being offset from the second; the bearing comprising inner and outer bearing rings movable relative to one another, the inner ring being secured for rotation about the second axis with the wheel-plate, the inner bearing ring being disposed generally concentrically within the outer bearing ring and the wheel-plate being disposed generally concentrically within the inner bearing ring so that the inner and outer bearing rings and the wheel-plate together form a substantially planar assembly. Since the wheel-plate and the two bearing rings fit one inside the other in a concentric fashion, the whole assembly can be made very much more shallow than if they were stacked one on top of the other. Industry standards require that the castor assembly wheels protrude above the surface of the deck or dolly by at least 15 mm and it has been usual to use wheels of standard size between 55 mm and 75 mm in diameter. Using the smaller diameter wheels, it is possible utilising castor assemblies in accordance with this aspect of the invention to construct a deck which have a total depth of 60 mm.

Preferably, the depth of the bearing measured in a direction parallel to the plane of the wheel is less than the diameter of the wheel. The depth of the castor assembly excluding the wheel measured in a direction parallel to the plane of the wheel is preferably less than the diameter of the wheel and the castor assembly is disposed about the axis of the wheel.

This is, as mentioned above, important where the castor assembly is to be used in a deck within, for example, an aircraft body, in circumstances where space is limited and a deep castor assembly reduces the space available for storage or transportation of freight. Conveying devices using conventional 'stacked up' castor assemblies are typically of the order of 9" (185 mm) deep and castors are therefore rarely used in aircraft.

The shallowness of the deck construction also has favourable cost implications in that the whole deck can be made more cheaply and the costs implicit in the operation of lifting freight onto the deck are reduced.

In accordance with another aspect of the invention there is provided a conveying device comprising a plate having an upper surface over which objects to be conveyed are moved, in use; the plate having formed therein at least one aperture in which is mounted a castor assembly comprising a wheel mounted on a wheel-plate for rotation about a first axis generally parallel to the surface of the plate and a bearing by means of which the wheel-plate can rotate about a second axis at an angle to the first axis and, hence, to the surface of the plate, the bearing and the wheel-plate being disposed such that they are below the upper surface of the plate so that only a portion of the wheel projects above the said upper surface of the plate.

The wheel-plate and inner and outer bearing rings are preferably such that the inner bearing ring is disposed generally concentrically within the outer bearing ring and the wheel-plate is disposed generally concentrically within the inner bearing ring so that the inner and outer bearing rings and the wheel-plate together form a substantially planar assembly.

By locating the bearing and the wheel-plate on which the wheel is mounted so that only a portion of the wheel projects above the upper surface of the plate, the vulnerable parts of the castor assembly are largely protected from damage caused by impacts from items of freight moving over the conveying device. If, as is preferable, the pivot axis about which the wheel rotates is close to the level of the plate, the torque arising from lateral impacts to the wheel is also minimised.

In a further aspect of the invention, there is provided a conveying device comprising a plate having an upper surface over which objects to be conveyed are moved, in use; the plate having formed therein at least one aperture in which is mounted a castor assembly comprising a wheel mounted on a wheel-plate for rotation about a first axis generally parallel to the surface of the plate and a bearing by means of which the wheel-plate can rotate about a second axis at an angle to the first axis and, hence, to the surface of the plate; the wheel-plate having formed therein a slot in which the wheel is received, the edges of the slot fitting closely around the wheel so that the bearing, wheel-plate and wheel together substantially completely fill the aperture in which the castor assembly is mounted.

With this arrangement, there is very little open space around the wheel into which a worker can inadvertently put a foot or hand and consequently the risk of injury to those involved in moving freight using such conveying devices is much reduced. In addition, because the wheel-plate and bearing ring assembly more or less fills the apertures formed in the plate, the whole structure is considerably stronger than would be the case if the apertures were left unfilled. As a result, the subframe needed to support the plate and its associated castor assemblies can be made less substantial and, in particular, lighter and less costly. The whole deck or dolly can thus be made of lighter construction.

Although the castor assembly and decks have been discussed above with a view to use with the wheel of each castor assembly protruding upwards to support items of freight as they are moved over the surface of the deck, it will be appreciated that the 'deck' construction may equally be mounted in an inverted position, where it will function in a manner similar to conventional castors on, for example, computers and other heavy space constrained equipment, or with the deck surface extending vertically or inclined to the horizontal. Such arrangements may be particularly useful in applications where, for example, heavy items are to be moved into and out of tight spaces.

BRIEF DESCRIPTION OF THE DRAWINGS

Embodiments of the invention will now be described by way of example only with reference to the accompanying drawings of which.

DETAILED DESCRIPTION OF THE INVENTION

Figure 1:
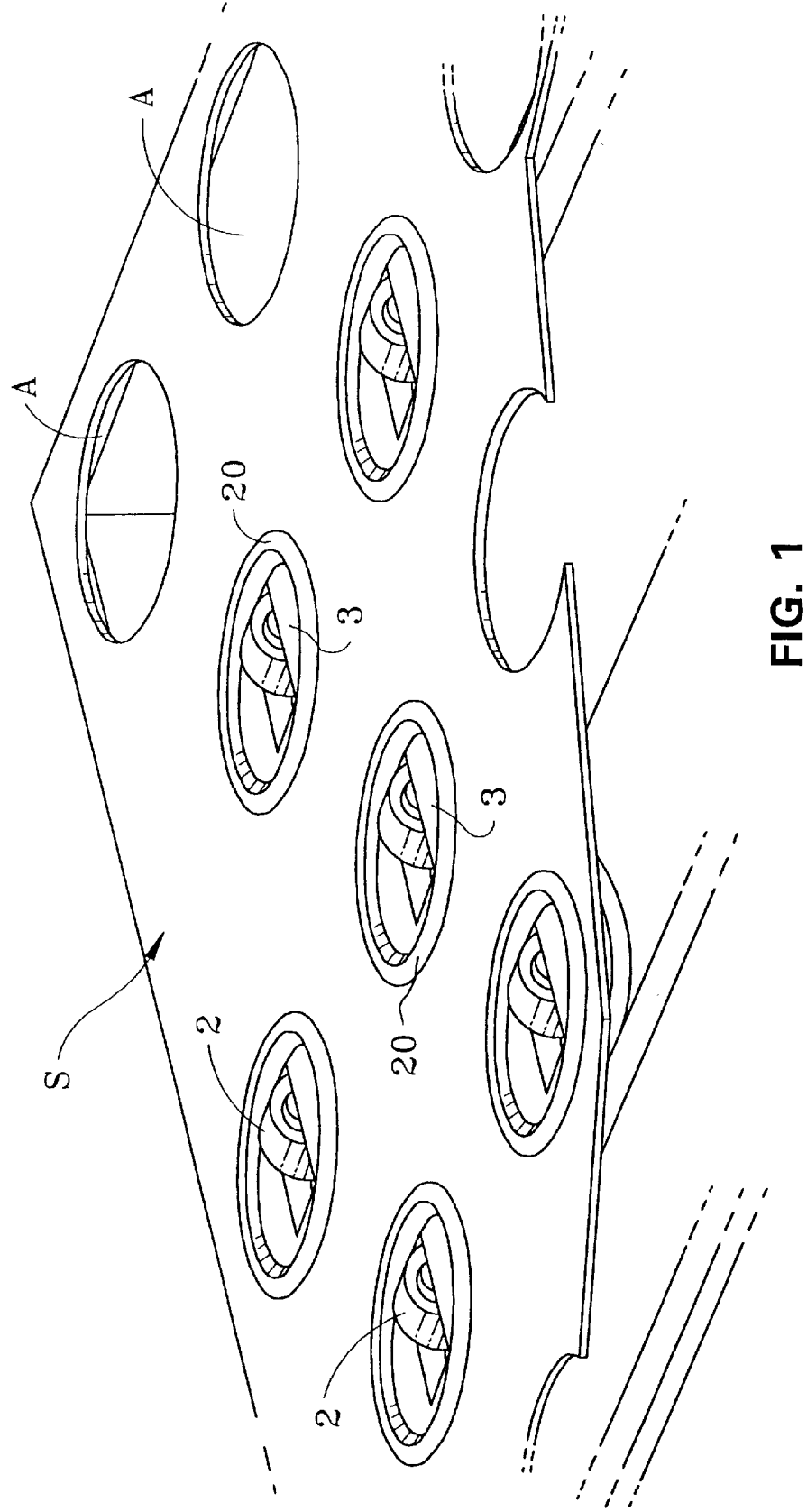
FIG. 1 shows a perspective view from above of part of a conveying device to the invention.

The conveying device shown in FIG. 1, for example, a deck or dolly of the kind described above, comprises a square or rectangular plate P having a flat upper surface S and a plurality of circular apertures A through which protrude parts of the wheels 2 of a plurality of castor assemblies 1. The apertures are spaced apart in a regular array e.g. such that when viewed in plan the centres of the apertures are at the corners of equilateral triangles (as shown) or squares. A series of plates P may be joined together to form a track along which goods in heavy packing cases may be pushed, the freight which is being moved over the track rolling on the protruding parts of the castor wheels 2. The upper surface S may be horizontal or inclined. As mentioned above, one specific use of such conveying devices is for loading and unloading aircraft.

As shown in FIGS. 2–5 a castor assembly 1 in accordance with the invention comprises a wheel 2 carried by a rotatable wheel-plate 3. The wheel-plate 3 seats in the inner ring 6 of a bearing 7.

The wheel-plate 3 is generally circular and formed from a flat sheet of material. The wheel-plate 3 is formed with a wide slot 9 extending more or less diametrically which accommodates the wheel 2. The slot 9 extends to the periphery 4 of the disc-like wheel-plate 3. The sheet material of the wheel-plate 3 where the slot 9 is formed is shaped and bent to form two depending tabs or forks 12 each provided with a through hole for receiving a pivot pin 13 on which the wheel 2 is mounted for rotation.

The bearing 7 comprises an inner ring 6 and an outer ring 19 which together form a ball race in which are located a plurality of ball bearings 18. The inner ring 6 is generally annular with a shallow annular recess 5 formed in the radial surface which is uppermost in the assembled deck or dolly and a v-shaped groove, which forms one half of the ball race formed in its outer peripheral surface. The recess 5 may be undercut at its outer edge 8.

The wheel-plate 3 fits into the recess 5 with the depending forks 12 projecting into the circular central opening of the inner ring 6 of the bearing 7. Preferably, the annular base surface of the recess S is formed with two detents 11 which engage the edge surfaces 10 of the slot 9 when the wheel-plate is positioned in the recess 5 so that the surfaces 10 are slightly sprung apart. In this position, the surfaces 10 abut, and are urged against, the detents 11 by the inherent spring force of the wheel-plate 3 to hold the wheel-plate 3 in place with its peripheral edge 4 located under the undercut at the outer edge 8 of the recess 5. When the wheel-plate 3 is received in the recess 5 of the inner ring 6 of the bearing 7, the upper surface of the wheel-plate 3 is coextensive with the upper surface of the outer part of the inner bearing ring 6.

Figure 2:
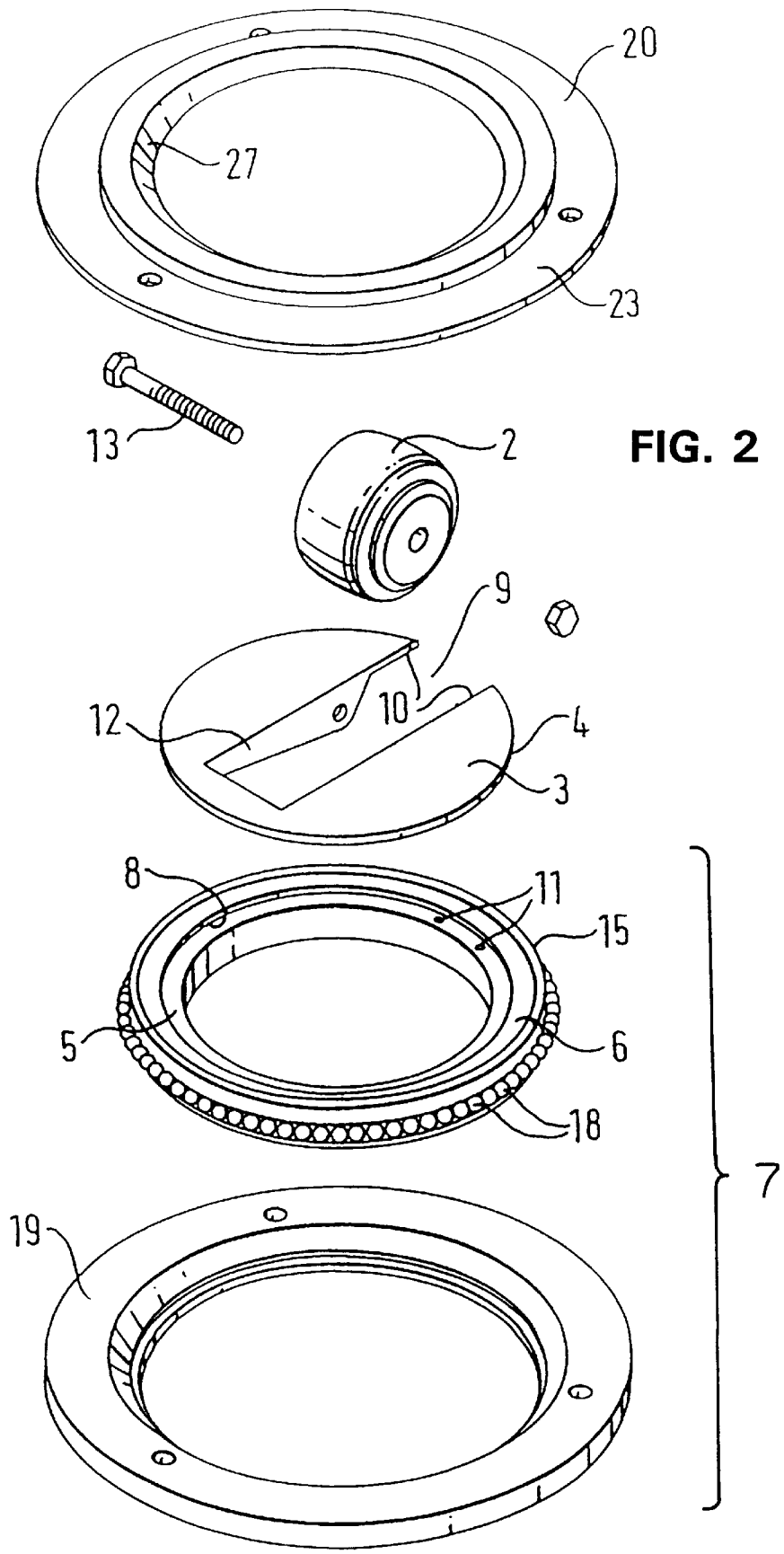
FIG. 2 shows an exploded view of a castor assembly forming part of a conveying device according to a first embodiment.
Figure 3:
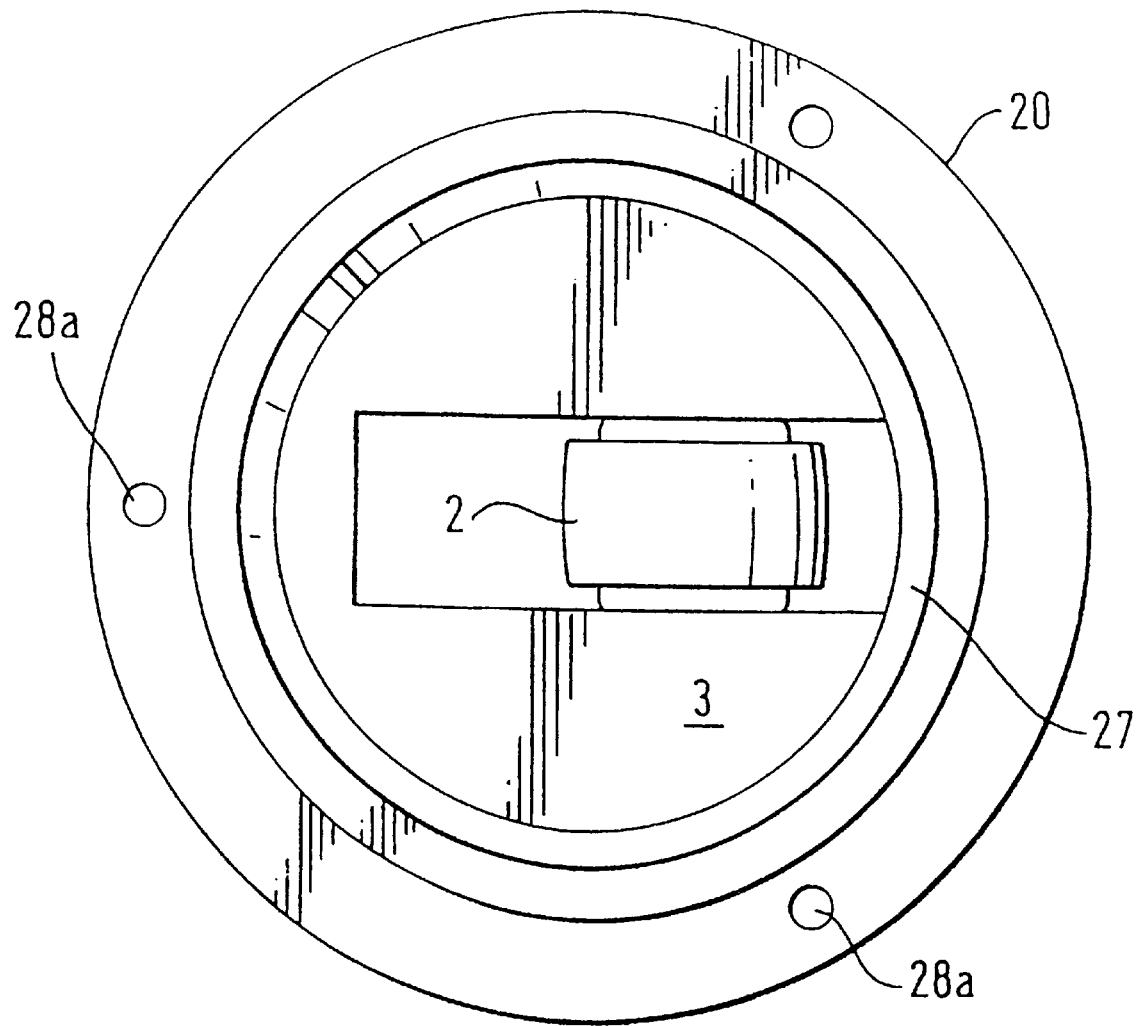
FIG. 3 shows a plan view of the castor assembly shown in FIG. 2.
Figure 4:
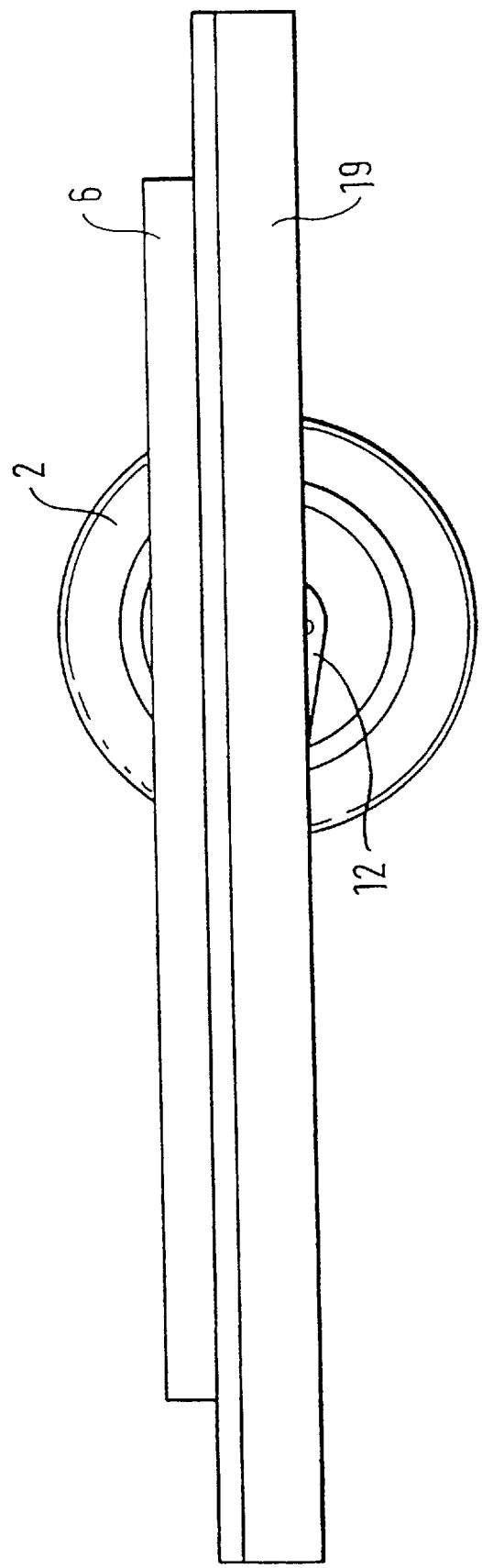
FIG. 4 shows a side view of the castor assembly shown in FIG. 2.
Figure 5:
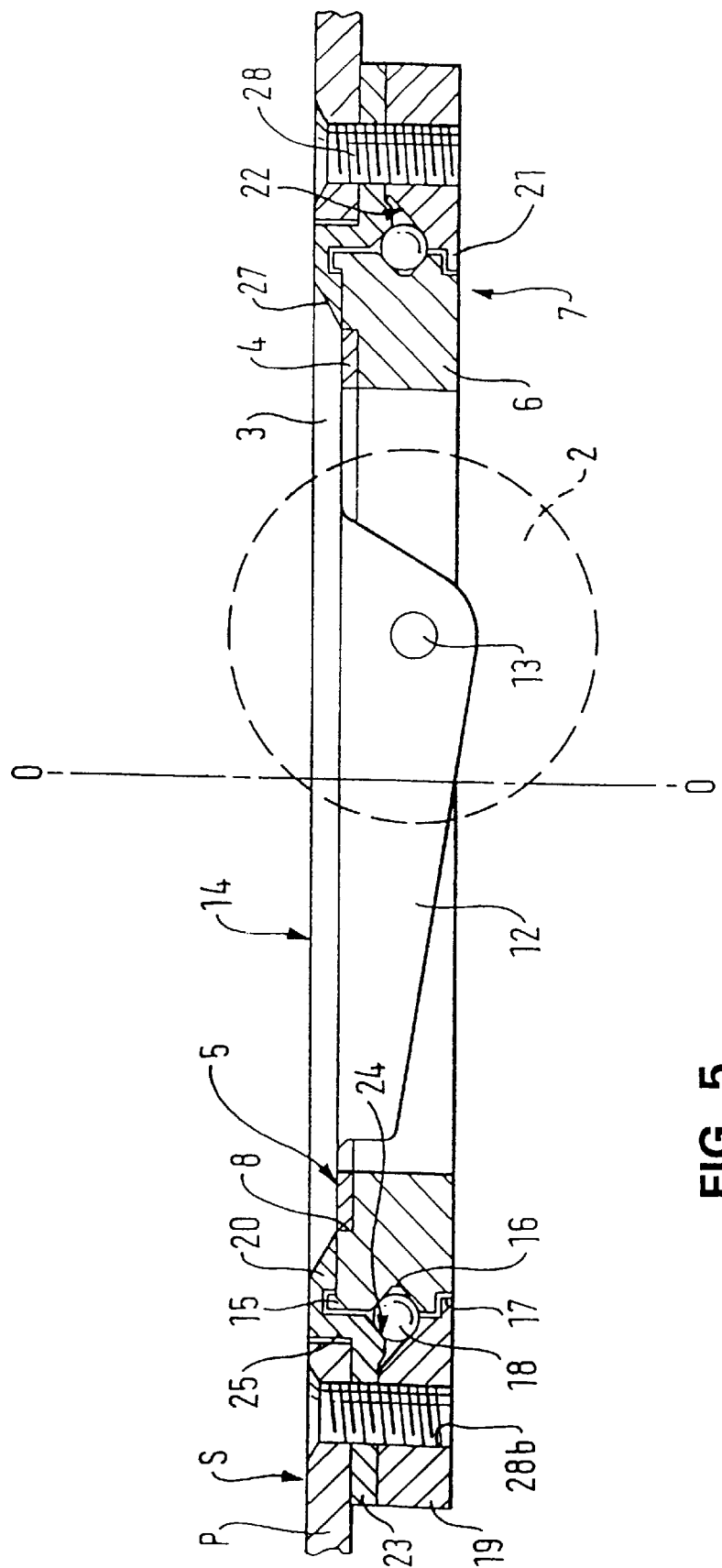
FIG. 5 shows a cross-sectional view of the castor assembly shown in FIG. 2.

The two parallel downwardly extending forks 12 on the wheel-plate 3 each having a generally triangular appearance when viewed from the side, as can be seen in FIGS. 2 and 5. The forks 12 support the pivot pin 13, at a position offset from the central axis 0—0 of the bearing 7, and parallel to the plane defined by the upper surface 14 of the disc-like wheel-plate 3 and the upper surface S of the plates P.

The castor wheel 2 has a radius greater than the distance between the axis of the pivot pin 13 and the upper surface 14 and is mounted on the pivot pin 13. Thus part of the wheel 2 protrudes above the wheel-plate surface 14 and the conveying surface S.

The wheel-plate 3 may be made of cast or pressed metal and subsequently machined to shape or moulded from a hard plastics material e.g. polypropylene or nylon. The wheel 2 may be of metal or a hard plastics material. The bearing rings 6 and 19, the balls 18, the screws 28 and the plate P are all made of suitable forms of steel.

It will be appreciated that these materials allow the manufacture of a rugged, hardwearing castor which can withstand constant impacts from items of freight moving over the deck or dolly in which the castor is mounted to give a relatively long usable lifetime before replacement becomes necessary. The use of hardwearing plastics material for the wheel itself has the advantage that noise is reduced.

It will also be noted that the pivot pin 13 is located slightly below but close to the plane of the plate P. Since the pivot pin 13 is below the plate P, so are the forks 12 on which the wheel 2 is supported. Consequently the forks 12 and pivot pin 13 are shielded from damage which might be inflicted by items of freight being moved over the plate P; they simply do not come into contact with the items moving across the plate P as they would if the pivot pin 13 were disposed above the plate P.

In addition, because the forks 12 are relatively shallow and the pivot pin 13 is supported close to the surface S of the plate P and, indeed, close to the plane defined by ball race of the bearing 7, the torque transmitted to the forks 12 and bearing 7 as a result of any lateral force exerted on the projecting part of the wheel 2 is minimised. As a result, the likelihood of damage to the castor assembly resulting from such forces is reduced. The wheels are, of course, further supported 5 against lateral movement by the close fit of the wheel-plate 3 around the wheel 2 which tends to limit any tendency to sideways movement in the wheel 2.

The bearing 7 also includes an outer ring 19. The ball bearings 18 are held in position by the outer bearing ring 19 and a sealing ring 20. The outer bearing ring 19 has a small inwardly-projecting flange 21 at its lowermost edge which is received in a corresponding annular recess 17 formed around the periphery of the lower edge of the inner bearing ring 6. The outer bearing ring 19 is also is shaped to form a part-conical surface 22 against which the balls 18 move.

The sealing ring 20 is in the form of a profiled ring and may be of steel or plastics material. A flat outwardly-projecting flange 23 of the sealing ring 20 is, in the assembled bearing, trapped between the upper surface of the outer ring 19 and the underside of the plate P in which the castor assembly is mounted. The sealing ring 20 is also formed with a part conical surface 24 against which the ball bearings 18 move. A portion 25 of the sealing ring 20 extends from the part conical surface 24 thereof to an inwardly-directed flange 27 and is positioned between the edge of the circular aperture A in the plate P and the outer circumferential edge of the inner ring 6 above the ball bearings 18. The inwardly-extending flange 27 of the sealing ring 20 covers part of the upper surface of the inner bearing ring 6. A circular groove on the underside of the flange 27 receives an upstanding ridge 15 formed on the uppermost surface of the inner ring 6 of the seal. The inner edge of the upper surface of the flange 27 of the sealing ring 20 is bevelled.

Three recessed screws 28 are spaced apart uniformly around the aperture in the plate P and pass through the plate P and thence through holes 28a in the sealing ring 20 to engage in screw threaded bores 28b in the outer ring 19. Thus when the screws 28 are tightened, the sealing ring 20 is clamped between the plate P and the outer ring 19, the ball bearings 18 are held in position in the ball race formed by the v-shaped groove and surfaces on the outer ring and the sealing ring 20. The screws also serve to secure the castor assembly as required to the plate P.

When the wheels 2 become worn and need replacement, the screws 28 are undone and the entire castor assembly simply lifts out of the plate P so that a fresh castor assembly can be inserted. This permits quick and easy replacement of worn castors.

As mentioned above, the part conical surface 24 of the sealing ring 20, together with the v-shaped groove in the outer peripheral surface of the inner ring 6 of the seal and the part conical surface formed on the outer ring 19 of the seal together form an enclosed ball race for containing the ball bearings 18. Because the ball race is completely enclosed, the penetration of dirt into the ball race, which can lead to jamming of the bearing 7, is largely prevented, the seal against ingress of dirt being improved further by the fact that the interengagement of the inner ring 6 of the seal with the sealing ring 20 and with the-outer ring 19, respectively, defines serpentine paths both above and below the ball race, as can best be seen in FIG. 5 of the drawings. These serpentine paths between the components which co-operate to form the ball race makes the ingress of dirt into the ball race less likely.

It is also to be noted that the three components which make up the bearing 7, the inner ring 6, the sealing ring 20 and the outer ring 19, are generally concentrically arranged. As a result, the bearing 7 can be made relatively shallow because the components fit one within the other, rather than stacking up one above the other. This in turn means that decks or dollies which utilise the castor assembly shown in FIGS. 2 to 5 can be made relatively shallow in construction which, as mentioned above, is particularly advantageous in the context of a fixed deck mounted within an aircraft body where space is at a premium.

The ball race, in particular, being defined by generally opposed peripheral surfaces of concentric components rather than, as has often been the case hitherto, between opposed annular surfaces formed on stacked components, can be made relatively shallow to permit space saving. Stacked annular components have been preferred because it was believed that ball races constructed in this way were less prone to penetration of dirt. In the assembly described however, good resistance to penetration of dirt is achieved using a ball race between peripheral-surfaces of the co-operating components. Penetration of dirt is minimised not by the orientation of the surfaces defining the ball race but rather by the interengagement of the inner and outer rings of the seal 7 and the sealing ring 20 to define serpentine gaps between the interengaging components.

As mentioned above, the wheel-plate 3 is received in the recess 5 formed in the upper surface of the inner ring 6 of the bearing 7. Together the bearing 7 and wheel-plate 3 form a continuous disc-like construction which, apart from the slot 9 in which the wheel 2 is received entirely closes the aperture A formed in the plate P forming the surface of the deck or dolly.

This construction has two advantages. Firstly, it is safe for personnel walking over the surface; there is little likelihood of their injuring a foot or ankle by catching it in the opening around the wheel. Secondly, because the apertures A in the plates P are largely closed off by the castor assemblies, the plate construction is very strong and the need for substantial sub-frame assemblies is reduced. This means that dollies incorporating the construction can be made lighter and, again, the overall depth of fixed decks in confined cargo spaces can be reduced.

The materials for the manufacture of the various components may be chosen having regard to the load bearing requirements of the construction and with a view to lightness and cost. The inner and outer rings of the bearing may be made of metal, plastics or other suitable materials. The ball bearings may be made of steel or, for low load applications, hard plastics materials such as nylon.

Figure 6:
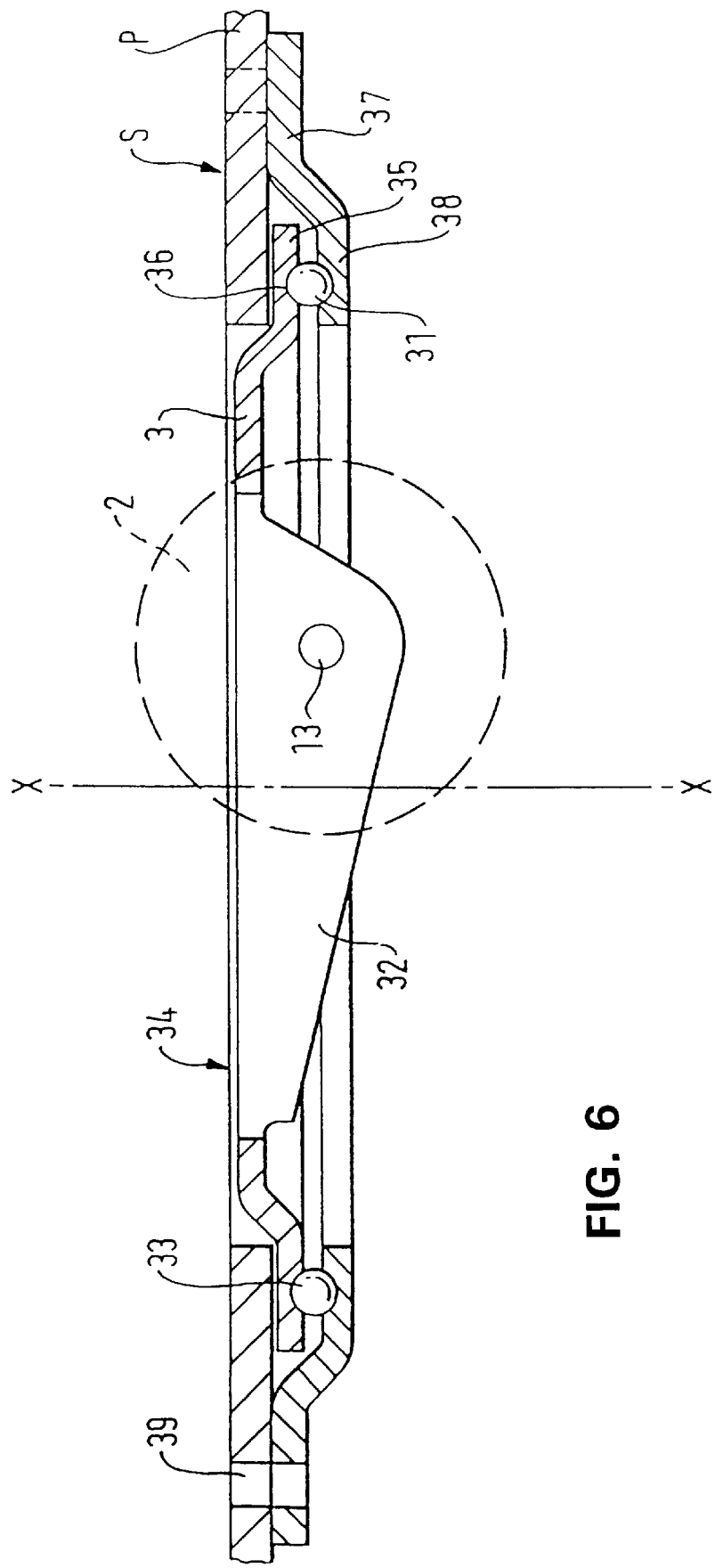
FIG. 6 shows a cross-sectional view of a castor assembly forming part of a conveying device according to a second embodiment.

A modified castor assembly is shown in FIG. 6. The castor assembly comprises a wheel-plate 3 and a castor wheel 2. The wheel-plate 3 is formed from a plate of sheet steel stamped and pressed to provide two spaced-apart parallel downwardly-extending forks 32 and a downwardly-displaced annular portion 35 which is parallel to the plate P. The outer periphery of the wheel-plate 3 is circular. A circular groove 36 having a suitable cross-section is provided on the underside of the displaced region 35 adjacent the outer extremity of the wheel-plate to form the upper part of a ball race for a plurality of balls 31.

The two downwardly-extending forks are provided with a pivot pin 13 on which is mounted a wheel 2. The pivot pin 13 is parallel to the upper surface 34 of the wheel-plate and offset from the central axis X—X of the ball race. The radius of the wheel 2 is greater than the distance between the upper surface 34 of the wheel-plate and the axis of the pivot pin 13. The upper surface 34 of the wheel-plate 3 is slightly below but parallel to the upper surface S of the plate P. The radius of the wheel 2 is greater than the distance between the surface S and the axis of the pivot pin 13 so that part of the wheel 2 protrudes above the surfaces 34 and the surface S.

On the underside of the plate P and around the circular aperture within which the castor assembly is located is a ring 37 of pressed steel having an outer part which is located against the under surface of the plate P. Screws or studs 39 may be used to attach this ring 37 to the plate P. The inner part of the ring 37 is displaced downwardly (see FIG. 6) and has a portion 38 which is parallel to the underside of and spaced apart from the downwardly-displaced part 35 of the wheel-plate 3. The upper surface of the displaced portion 38 is provided with a circular groove 33 which forms the lower part of the ball race for the balls 31.

The wheel-plate 3, the ring 37, the conveying plate P and the balls may all be manufactured from suitable forms of steel. The castor wheel 2 may be of steel or of a hard plastics material such as nylon or polypropylene.

Figure 7:
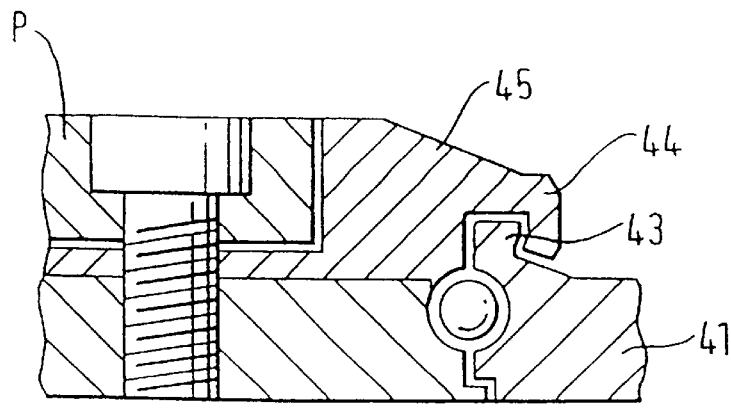
FIG. 7 shows a cross-sectional view of part of a castor assembly forming part of a conveying device according to a third embodiment.
Figure 8:
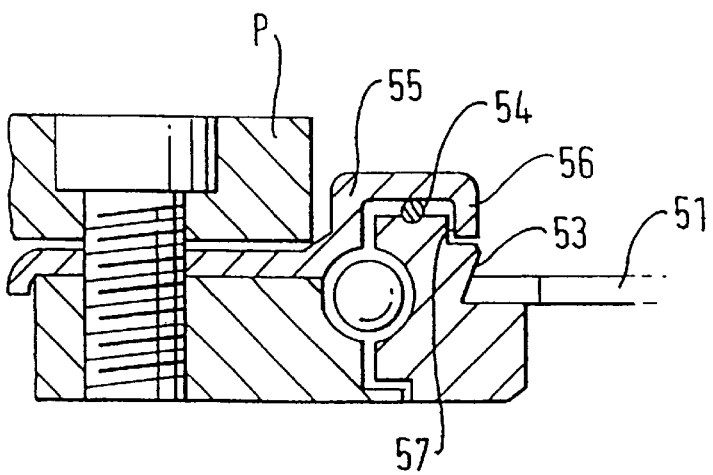
FIG. 8 shows a cross-sectional view of part of a castor assembly forming part of a conveying device according to a fourth embodiment.
Figure 9:
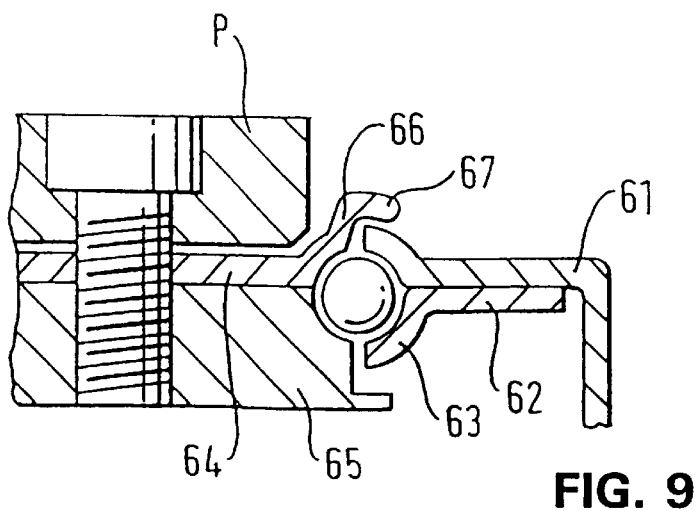
FIG. 9 shows a cross-sectional view of part of a castor assembly forming part of a conveying device according to a fifth embodiment.

The further castor assemblies shown in FIGS. 7–9 are modifications of the assembly shown in FIGS. 2–5. In particular, FIGS. 7–9 show alternative bearings suitable for use in a castor assembly which is, in other respects similar to that of FIGS. 2–5.

In the modified bearing of FIG. 7, the outer circumference of the inner bearing ring 41, which is analogous to the inner ring 6 of the bearing 7 in FIGS. 2–5, is formed with a large upstanding ridge 43 having an undercut inwardly-facing circumferential surface. A sealing ring 45 is clamped between the inner bearing ring 41 and the plate P and has an inwardly projecting nose portion 44 which hooks over and locates in the undercut inner surface of the ridge 43. The upper surface of the wheel-plate in this embodiment is slightly below the upper surface S of the plate and the castor wheel has a portion which protrudes not only above the upper surface of the wheel-plate but also above the plane of the upper surface of the conveying plate.

FIG. 8 shows a further alternative bearing construction for use in the castor assembly of FIGS. 2–5. In this construction the inner bearing ring 58 is provided on its upper surface with an O-ring 54 in a small circumferential groove. The wheel-plate 51 fits in a recess having an undercut surface at 53. A sealing ring 55 is clamped between the outer bearing ring and the underside of the plate P and has a surface which forms part of the ball race and a grooved portion which fits over the upper part of the inner bearing ring with an inner circumferentially downwardly-extending portion 56 seating in a recess 57 in the inner bearing ring. The sealing ring 55 thus contacts the O-ring to provide an improved sealing arrangement.

In the construction shown in FIG. 9 the wheel-plate 61 is formed from a pressed steel plate and has a circular outer periphery. Adjacent the periphery, part of the wheel-plate is displaced upwards (see FIG. 9) to form a quarter part of a ball race. Attached to the underside of the edge of the wheel-plate e.g. by screws (not shown) is a ring 62 having a downwardly displaced portion 63 which forms another quarter part of the ball race. An outer bearing ring 65 is secured to the underside of the plate P and has a shaped corner portion forming a further quarter of the ball race. Clamped between the outer bearing ring 65 and the cover plate P is a sealing ring 64 having an upstanding portion 66 which forms the last quarter part of the ball race and has a further inwardly-extending portion 67 which covers the outer periphery of the wheel-plate 61.

In this construction, the upper surface of the wheel-plate 61 is below the upper surface of the plate P but part of the castor wheel protrudes above the upper surface S of the conveying plate P.

FIGS. 10 to 13 illustrate a further castor assembly in accordance with the invention.

Figure 10:
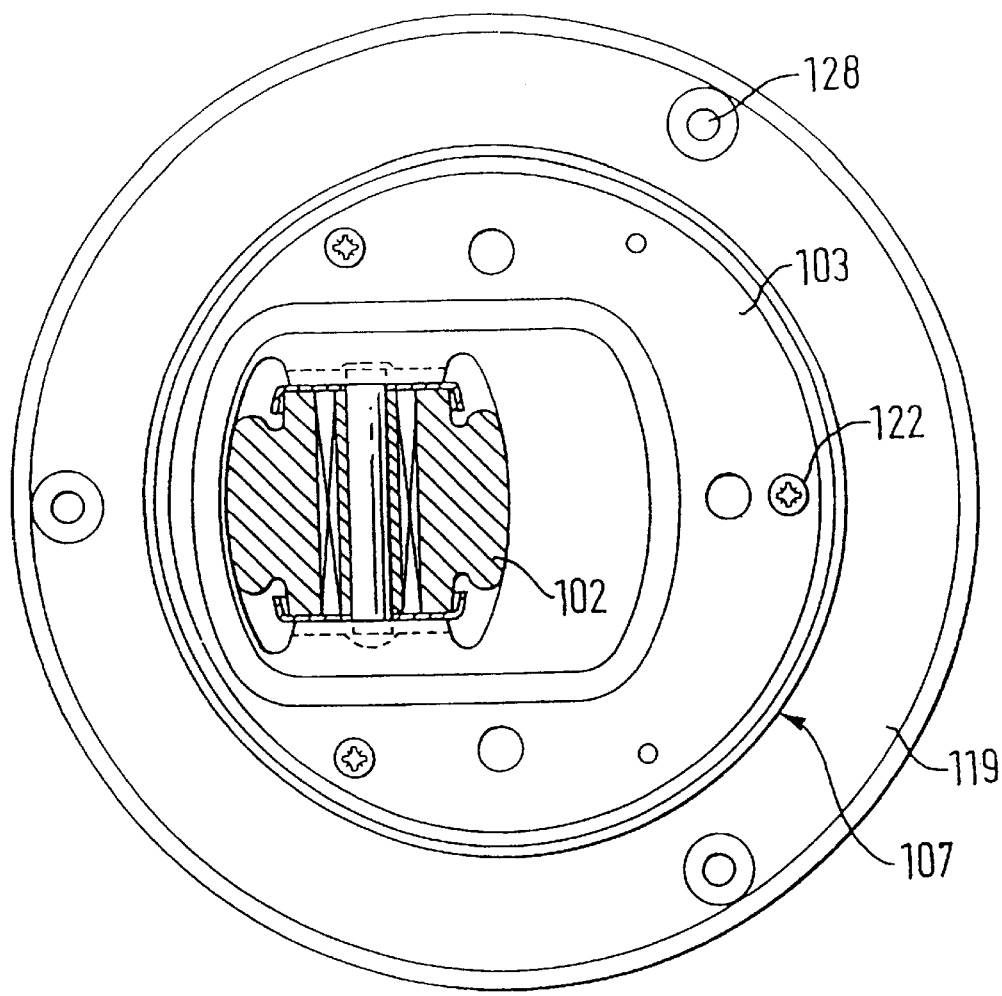
FIG. 10 shows a cross-sectional view of a castor assembly in accordance with a sixth embodiment of the invention.
Figure 11:
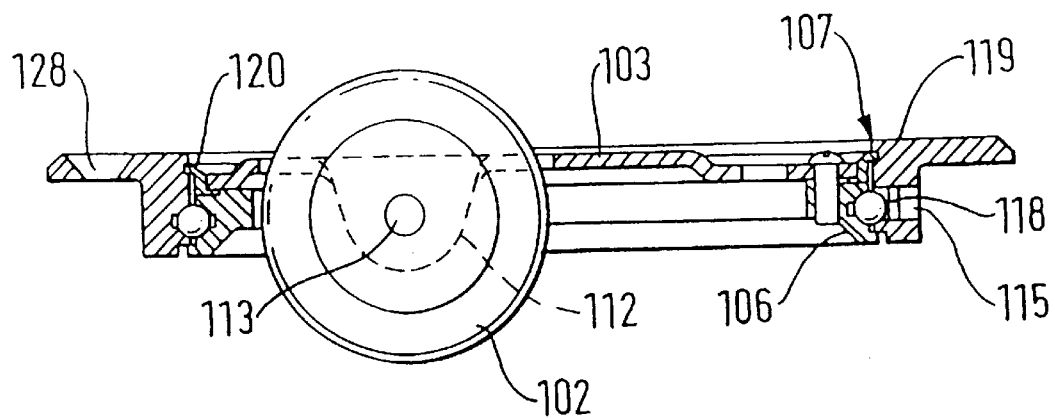
FIG. 11 shows the castor assembly of FIG. 10 as seen from above.

As can be seen from FIGS. 10 and 11, in particular, the castor assembly comprises a wheel 102 carries by a wheel-plate 103 which sits on the inner ring 106 of a bearing 107.

The wheel-plate 103 is formed of sheet metal and is provided with an opening, at opposite parallel edges of which the sheet metal is cut and bent to form two depending tabs 112 which serve as forks for supporting a pivot pin 113 on which the wheel 102 is mounted for rotation.

The bearing by means of the wheel-plate 103 is mounted for rotation comprises inner and outer rings 106 and 119 which together form a ball race in which are located a plurality of ball bearings 118. In general the bearing is similar to that described in relation to the first embodiment but the detailed construction is quite different.

The outer ring 119 is provided on its inwardly facing surface with a semicircular groove which forms one half of the ball race. A radially extending bore 115 is formed at one point in the circumference of the outer ring 119, extending from the ball race to the exterior of the ring 119. The outer ring 119 is also provided with an outwardly extending flange which, in use, rests on the surface of the deck or cover-plate around the periphery of the aperture in which the castor assembly is mounted. The flange on the outer ring 119 is provided with a plurality, three as shown in the drawings, of openings 128 which receive screws used to secure the outer ring 119 to the deck or cover-plate.

The inner ring 106 is positioned concentrically within the outer ring 119 of the bearing 107 and is provided on its outwardly facing surface with a semi-circular cross section groove which forms the other half of the ball race. Ball bearings are introduced into the ball race through the bore 115 during manufacture. The outer end of the bore 115 is then closed by means of a suitable plug. This form of side-loading ball bearing is well known and is described and claimed in United Kingdom patent No. 247654 dated Nov. 8, 1924 and issued to H. S. Hele-Shaw et al.

Figure 12:
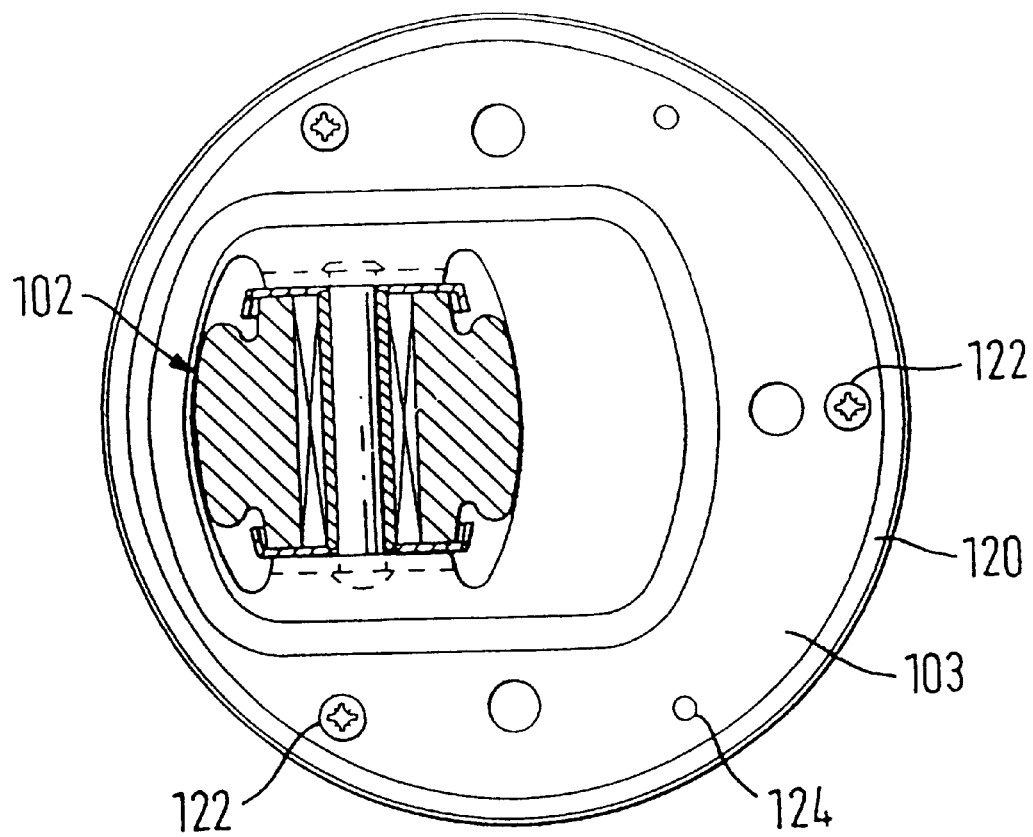
FIG. 12 shows the wheel-plate sub-assembly of the castor assembly of FIG. 10 from above.
Figure 13:
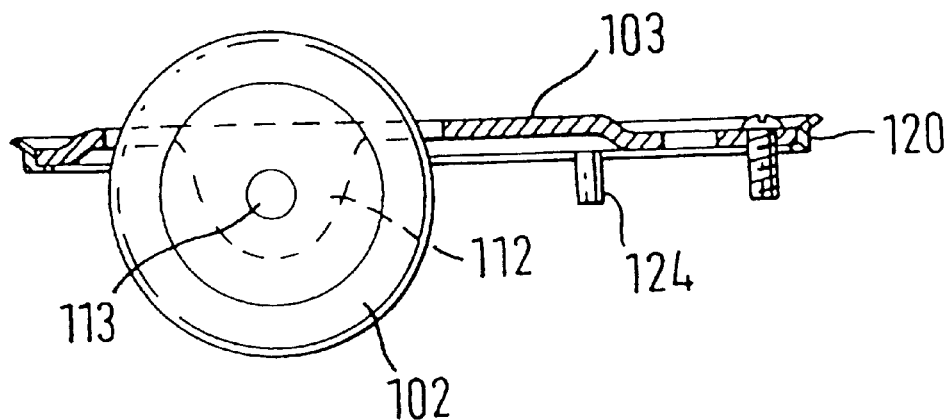
FIG. 13 shows a cross-sectional view through the wheel-plate sub-assembly of FIG. 12.

The wheel-plate 103 forms part of a sub-assembly shown in FIGS. 12 and 13. In addition to the wheel-plate 103 itself, the sub-assembly includes the pivot pin 113 and wheel 102 and, most importantly, a seal 120. The seal 120 is a ring of generally z-shaped cross section. The lower limb of the 'z' locates under the periphery of the wheel-plate 103 and the upper limb overlies, as can be seem most clearly from FIG. 10, the gap between the inner and outer rings 106 and 119 of the bearing 107 so as to minimise penetration of dust and dirt into the bearing 107.

The wheel-plate 103 is provided with screw-holes 122 by means of which the wheel-plate sub-assembly can be secured to the inner ring 106 of the bearing. Preferably the sub-assembly is also provided with dowels 124 which locate in suitable openings in the outer ring 106 to ensure proper alignment of the wheel-plate 103 and the wheel 102 it carries with other assemblies mounted on the conveying device.

It will be appreciated that the wheel-plate sub-assembly can be removed and replaced simply by undoing the three screws which pass through the screw-holes 122, lifting out the entire sub-assembly and replacing it with a fresh sub-assembly which simply drops into the opening defined by the inner ring 106. Alignment of the new sub-assembly is ensured by the location of the dowels 124 in the openings provided in the inner ring 106 and the screws are replaced in screw-holes 122. Securing of the wheel-plate sub-assembly traps the lower limb of the seal 120 between the wheel-plate 103 and the inner ring 106 of the bearing 107 to hold it securely in place.

This arrangement allows for quick and easy replacement of the wheel-plate sub-assembly when the wheel is worn or damaged and has the additional advantage that a fresh seal is included in the sub-assembly so that each time the wheel is replaced, the seal is replaced automatically, improving resistance to penetration of the bearing by dirt.

What is claimed is:

1. A castor assembly comprising:
a wheel having a load-contacting portion;
a carriage, on which said wheel is mounted for rotation about a first axis; and
a bearing operable to enable said carriage to rotate about a second axis inclined with respect to said first axis, said first axis being spaced from said second axis; said bearing comprising inner and outer bearing rings movable relative to one another, said inner bearing ring being secured to said carriage for rotation with said carriage about the second axis, and being disposed generally concentrically with and within said outer bearing ring so that said inner and outer bearing rings are substantially co-planar; said carriage being disposed generally concentrically within said inner bearing ring so that said inner bearing ring and said carriage are substantially co-planar, and said inner and outer bearing rings and said carriage, in combination, forming a substantially planar assembly;
the first axis about which said wheel rotates being located below a plane defined by said inner and outer bearing rings so that only the load-contacting portion of said wheel projects outwardly from the planar assembly; a depth of said castor assembly excluding said wheel, measured in a direction parallel to the plane of the wheel, being less than the diameter of said wheel.

2. The castor assembly set forth in claim 1, wherein said carriage comprises a wheel-plate on which said wheel is mounted for rotation about the first axis, said wheel-plate being releasably secured to said bearing so that, in the event of damage to said wheel, said wheel-plate and said wheel mounted thereon are capable of removal from said bearing for replacement with another undamaged wheel.

3. The castor assembly forth in claim 2, wherein said wheel-plate is releasably secured to said bearing by threaded screws or bolts.

4. The castor assembly set forth in claim 3, comprising a seal extending around a periphery of said wheel-plate so that, when said wheel-plate is secured to said bearing, said seal is positioned so as to oppose penetration of dirt into said bearing.

5. The castor assembly set forth in claim 2, comprising a seal extending around a periphery of said wheel-plate so that, when said wheel-plate is secured to said bearing, said seal is positioned so as to oppose penetration of dirt into said bearing.

6. The castor assembly set forth in claim 1, wherein said inner and outer bearing rings at least partially define a ball race therebetween.

7. A castor assembly comprising:
a wheel;
a carriage, on which said wheel is mounted for rotation about a first axis; and
a bearing operable to enable said carriage to rotate about a second axis, said first axis being offset from said second axis;
said bearing comprising inner and outer bearing rings movable relative to one another, said inner bearing ring being secured for rotation with said carriage about the second axis and being disposed generally concentrically within said outer bearing ring, and said carriage being disposed generally concentrically within said inner bearing ring so that said inner and outer bearing rings and said carriage together form a substantially planar assembly; the first axis about which said wheel rotates being spaced below the planar assembly defined by said inner and outer bearing rings and said carriage so that a load-contacting portion of said wheel projects outwardly from the planar assembly;
a depth of said castor assembly excluding the wheel, measured in a direction parallel to the plane of said wheel, being less than the diameter of said wheel.

8. The castor assembly set forth in claim 7, wherein said carriage comprises a wheel-plate on which the wheel is mounted for rotation about the first axis, said wheel-plate being releasably secured to said bearing so that, in the event of damage to said wheel, said wheel-plate and said wheel mounted thereon are capable of removal from said bearing and replacement with another undamaged wheel.

9. The castor assembly set forth in claim 8, wherein said wheel-plate is releasably secured to said bearing by threaded screws or bolts.

10. The castor assembly set forth in claim 9, comprising a seal extending around a periphery of the wheel-plate so that, when said wheel-plate is secured to said bearing, said seal is positioned so as to oppose penetration of dirt into said bearing.

11. The castor assembly set forth in claim 8, comprising a seal extending around a periphery of the wheel-plate so that, when said wheel-plate is secured to said bearing, said seal is positioned so as to oppose penetration of dirt into said bearing.

12. The castor assembly set forth in claim 7, wherein said inner and outer bearing rings at least partially define a ball race therebetween.

13. A device comprising:
   a plate having an upper surface over which objects are moved, said plate having formed therein at least one aperture; and
   a castor assembly mounted in said aperture, said castor assembly comprising:
      a wheel mounted on a carriage for rotation about a first axis generally parallel to the upper surface of said plate; and
      a bearing for enabling the carriage to rotate about a second axis inclined with respect to the first axis and the upper surface of said plate;
   said bearing and said carriage being disposed below the upper surface of said plate so that only a portion of said wheel projects above the upper surface of said plate, and
   wherein a depth of said castor assembly, excluding said wheel, measured in a direction parallel to a plane of the wheel, is less than the diameter of said wheel.

14. A device comprising:
   a plate having an upper surface over which objects are moved, said plate having formed therein at least one aperture; and
   a castor assembly mounted in said aperture, said castor assembly comprising:
      a wheel mounted on a carriage for rotation about a first axis generally parallel to the upper surface of said plate; and
      a bearing for enabling the carriage to rotate about a second axis inclined with respect to the first axis and the upper surface of said plate;
   said bearing and said carriage being disposed below the upper surface of said plate so that only a portion of said wheel projects above the upper surface of said plate,
   wherein said carriage includes a slot in which said wheel is received, the edges of said slot fitting closely around said wheel so that said bearing, said carriage and said wheel together substantially completely fill said aperture in which said castor assembly is mounted, and
   wherein a depth of said castor assembly, excluding said wheel, measured in a direction parallel to a plane of the wheel, is less than the diameter of said wheel.

15. A device comprising:
   a plate having an upper surface over which objects are moved, said plate having formed therein at least one aperture; and
   a castor assembly mounted in said aperture, said castor assembly comprising:
      a wheel mounted on a carriage for rotation about a first axis generally parallel to the upper surface of said plate; and
      a bearing for enabling the carriage to rotate about a second axis inclined with respect to the first axis and the upper surface of said plate;
   said bearing and said carriage being disposed below the upper surface of said plate so that only a portion of said wheel projects above the upper surface of said plate,
   wherein inner and outer bearing rings at least partially define a ball race therebetween and at least one of said inner and outer bearing rings are profiled such that interengagement of said inner and outer bearing rings at at least one side of said ball race defines a path between said rings from said ball race to an exterior of said bearing including at least one turn through an angle of 90 degrees or less.

16. A device comprising:
   a plate having an upper surface over which objects are moved, said plate having formed therein at least one aperture; and a castor assembly mounted in said aperture, said castor assembly comprising:
      a wheel having a load-contacting portion;
      a carriage, on which said wheel is mounted for rotation about a first axis; and
      a bearing operable to enable said carriage to rotate about a second axis inclined with respect to said first axis, said first axis being spaced from said second axis; said bearing comprising inner and outer bearing rings movable relative to one another, said inner bearing ring being secured to said carriage for rotation with said carriage about the second axis, and being disposed generally concentrically with and within said outer bearing ring so that said inner and outer bearing rings are substantially co-planar; said carriage being disposed generally concentrically within said inner bearing ring so that said inner bearing ring and said carriage are substantially co-planar, and said inner and outer bearing rings and said carriage, in combination, form a substantially planar assembly;
      the first axis about which said wheel rotates being located below a plane defined by said inner and outer bearing rings so that only the load-contacting portion of said wheel projects outwardly from the planar assembly; a depth for said castor assembly excluding said wheel, measured in a direction parallel to the plane of the wheel, being less than the diameter of said wheel.

17. The device set forth in claim 16, wherein said carriage includes a slot in which said wheel is received, the edges of said slot fitting closely around said wheel so that said bearing, said carriage and said wheel together substantially completely fill said aperture in which said castor assembly is mounted.

18. The device set forth in claim 16, wherein inner and outer bearing rings at least partially define a ball race therebetween.

19. The device set forth in claim 16, wherein said castor assembly is releasably secured to said plate by threaded screws or bolts.

20. A device according to claim 16, wherein said carriage comprises a wheel-plate, and said castor assembly is releasably secured to said plate so that, in the event of damage to said wheel, said wheel-plate and said wheel are capable of removal from said bearing and replacement with another undamaged wheel or wheel-plate.

21. A device comprising:
   a plate having an upper surface over which objects are moved, said plate having formed therein at least one aperture; and a castor assembly mounted in said aperture, said castor assembly comprising:
      a wheel;
      a carriage, on which said wheel is mounted for rotation about a first axis; and
      a bearing operable to enable said carriage to rotate about a second axis, said first axis being offset from said second axis;

said bearing comprising inner and outer bearing rings movable relative to one another, said inner bearing ring being secured for rotation with said carriage about the second axis and being disposed generally concentrically within said outer bearing ring, and said carriage being disposed generally concentrically within said inner bearing ring so that said inner and outer bearing rings and said carriage together form a substantially planar assembly; the first axis about which said wheel rotates being spaced below the planar assembly defined by said inner and outer bearing rings and said carriage so that a load-contacting portion of said wheel projects outwardly from the planar assembly; a depth of said castor assembly excluding the wheel, measured in a direction parallel to the plane of said wheel, being less than the diameter of said wheel.

* * * * *